W. KROPP.
WOOD SAWING MACHINE.
APPLICATION FILED JUNE 6, 1911.
1,062,544.
Patented May 20, 1913.
2 SHEETS—SHEET 1.
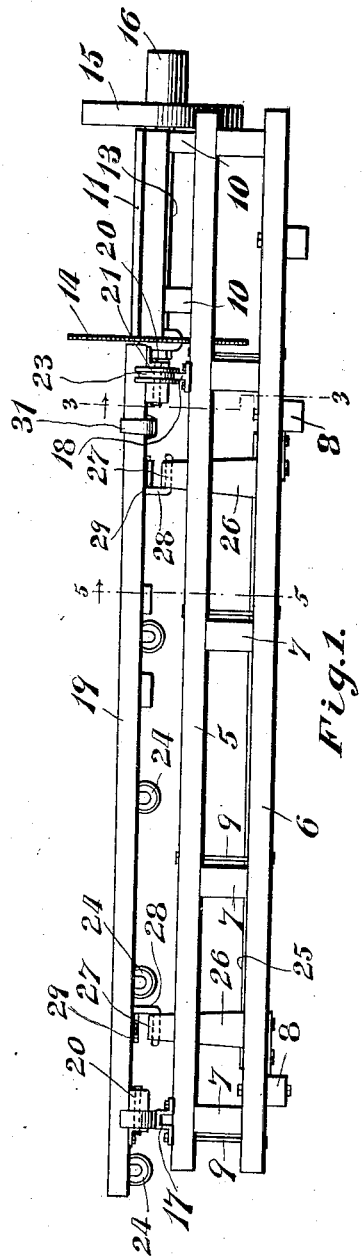
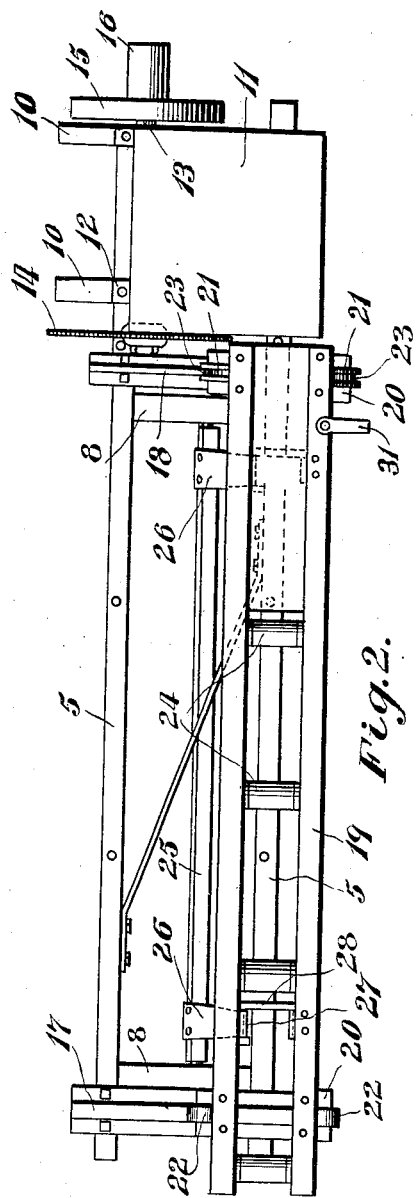
Inventor
*William Kropp*
By *Victor J. Evans*
Attorney
Witnesses
*Thos. F. Knox,*

W. KROPP.
WOOD SAWING MACHINE.
APPLICATION FILED JUNE 6, 1911.
1,062,544.
Patented May 20, 1913.
2 SHEETS—SHEET 2.
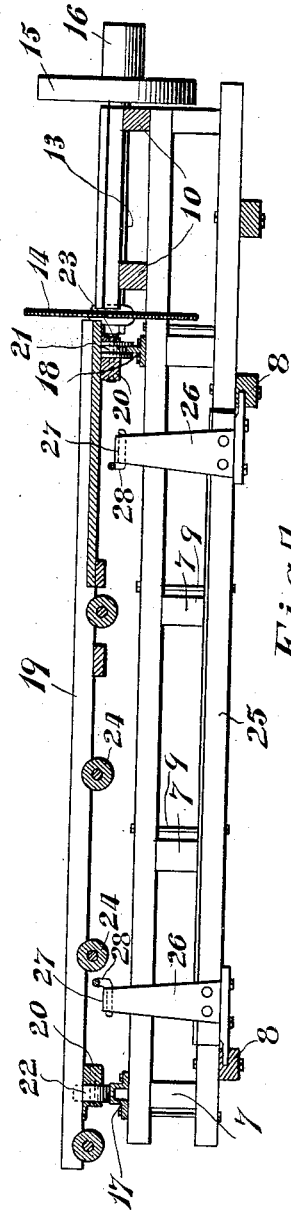
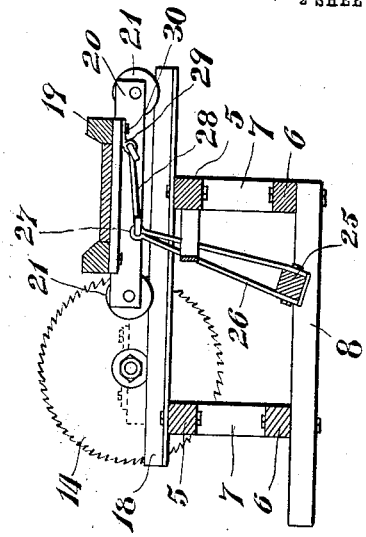
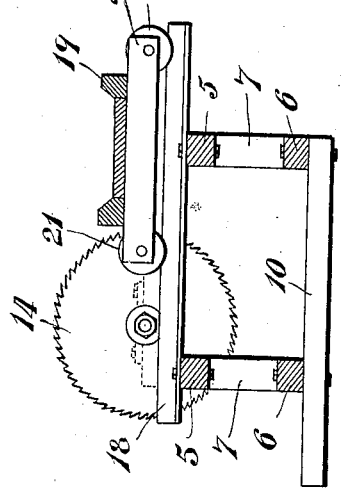
Witnesses
Thos. F. Knox,
Inventor
William Kropp
By Victor J. Evans
Attorney

UNITED STATES PATENT OFFICE.

WILLIAM KROPP, OF MAPLE CITY, MICHIGAN.

WOOD-SAWING MACHINE.

1,062,544. Specification of Letters Patent. Patented May 20, 1913.

Application filed June 6, 1911. Serial No. 631,573.

*To all whom it may concern:*

Be it known that I, WILLIAM KROPP, a citizen of the United States, residing at Maple City, in the county of Leelanau and State of Michigan, have invented new and useful Improvements in Wood-Sawing Machines, of which the following is a specification.

The invention relates to sawing machines, and more particularly to the class of wood sawing machines.

The primary object of the invention is the provision of a sawing machine of this character in which there is arranged a movable work supporting carriage, the latter being connected, through the medium of an equalizer, to the frame, so as to prevent the irregular movement of the carriage or the longitudinal displacement thereof, when the sawing machine is in operation.

Another object of the invention is the provision of a machine of this character in which the work to be sawed will be properly guided to the circular saw, without possibility of the displacement of the work, while the saw is in operation.

A further object of the invention is the provision of a sawing machine in which the frame thereof is provided with tracks, on which travels a forwardly and backwardly movable work supporting carriage, which is connected with the frame by means of an equalizer, so as to steady the carriage and prevent the shifting of the same at either end, but causing it to move with uniformity and permit the work supported thereby to be presented to the saw in proper alinement therewith.

A still further object of the invention is the provision of a saw of this character which is simple in construction, strong, durable, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a sawing machine constructed in accordance with the invention. Fig. 2 is a top plan view thereof. Fig. 3 is a sectional view on the line 3—3 of Fig. 1. Fig. 4 is a vertical longitudinal sectional view through the machine. Fig. 5 is a sectional view on the line 5—5 of Fig. 1.

Similar reference characters indicate corresponding parts throughout the several views of the drawings.

Referring to the drawings by numerals, the sawing machine comprises a main frame, including spaced parallel upper and lower longitudinal side beams 5 and 6, respectively, the same being spaced from each other by means of vertical posts 7, secured therebetween at intervals throughout the length of the beams, the lower side beams 6 being fixed to transverse brace ties 8 in any suitable manner, the latter designed to rest upon a floor or foundation. Extending from one bottom side beam 6 to one top side beam 5, at opposite sides of the frame, are downwardly inclined brace bars 9 which strengthen the frame to increase the rigidity thereof.

Near one end of the frame and fixed transversely to the top side bars 5 are spaced parallel cross beams 10, on which is mounted a delivery deck or platform 11, the same extending transversely of the frame. At one side of the platform 11 and fixed to the cross beams 10 are bearings 12, in which is journaled a rotary shaft 13, the inner end of which has fixedly connected thereto a circular saw 14, while the opposite end of the shaft has mounted thereon a fly wheel 15 and an adjacent band wheel 16, over which is adapted to be trained an endless band which is driven from any suitable motive power for rotating the saw.

Mounted transversely of the frame and secured to the upper side beams 5 are spaced wide and narrow gaged tracks 17 and 18, upon which is adapted to travel a work supporting carriage 19, having depending therefrom bearings 20, in which are journaled pairs of rollers 21 and 22, the rollers 22 being formed with flat peripheries adapted to travel upon the wide gaged track 17, while the rollers 21 are formed in their peripheries with annular grooves 23 receiving the narrow gaged track 18, and are adapted to travel thereon. The carriage 19 has journaled therein, at intervals, rollers 24, on which is adapted to rest the timber to be cut, the carriage 19 being elongated and extending longitudinally of the frame, so as to support logs or other timber of different lengths, and to present the same into position to be severed by the saw 14 when the carriage is moved in one direction on the tracks supported by the frame.

Journaled in the cross ties 8, at the bottom of the frame, centrally between the bottom side beams 6, and disposed in longitudinal parallelism therewith, is a rocking equalizer, comprising a beam 25 having fixed near opposite ends upwardly extending arms 26, the same being formed with eye terminals 27, in which are engaged links 28, the same being loosely connected in eyes 29 formed on the plates 30 fixed to the under face of the carriage 19, near the front side edge thereof, the equalizer being adapted to steady the movement of the carriage and to prevent the shifting thereof at either end, but causing it to travel in a uniform manner upon the tracks, without possibility of any irregular displacement, when supporting timber to be cut by the saw.

The carriage, near the end adjacent to the saw 14, is provided with a hand hold 31, which is adapted to be engaged by an operator for moving the carriage forwardly and backwardly on the main frame when the saw is in operation, whereby the timber supported by the carriage will be severed by the saw.

What is claimed is:

In a device of the kind described a combination with a supporting frame, and an elongated work supporting carriage movable laterally thereof; of means to urge said carriage in one direction including a plurality of levers having widened lower ends forming elongated sockets, pivot means for supporting said levers intermediate their ends, links connecting said carriage and the upper ends of said levers, and a weight member fixedly secured in said elongated sockets whereby said levers are compelled to move in unison.

In testimony whereof I affix my signature in presence of two witnesses.

WILLIAM KROPP.

Witnesses:
W. J. CULVER,
F. M. STEFANIAK.

Copies of this patent may be obtained for five cents each, by addressing the "Commissioner of Patents, Washington, D. C."